US012795021B2

(12) United States Patent
Ives

(10) Patent No.: US 12,795,021 B2
(45) Date of Patent: *Nov. 10, 2026

(54) SPAM TELEPHONE CALL REDUCER

(71) Applicant: T-Mobile USA, Inc., Bellevue, WA (US)

(72) Inventor: Derrick Ives, North Bend, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 230 days.

This patent is subject to a terminal disclaimer.

(21) Appl. No.: 18/674,466

(22) Filed: May 24, 2024

(65) Prior Publication Data

US 2024/0314238 A1 Sep. 19, 2024

Related U.S. Application Data

(63) Continuation of application No. 18/218,567, filed on Jul. 5, 2023, now Pat. No. 12,028,481, which is a (Continued)

(51) Int. Cl.
*H04M 3/436* (2006.01)
*H04L 9/40* (2022.01)

(52) U.S. Cl.
CPC ...... *H04M 3/4365* (2013.01); *H04L 63/0236* (2013.01); *H04M 2203/555* (2013.01); *H04M 2203/556* (2013.01)

(58) Field of Classification Search
CPC ......... H04M 3/4365; H04M 2203/555; H04M 2203/556; H04M 2203/551; H04M 3/436; (Continued)

(56) References Cited

U.S. PATENT DOCUMENTS 7,307,997 B2 12/2007 Vinokurov
9,167,078 B2 10/2015 Spievak
(Continued)

FOREIGN PATENT DOCUMENTS

JP 2007259045 A 10/2007
KR 20170009537 A 1/2017
KR 20170111275 A 10/2017

OTHER PUBLICATIONS

European Application No. 22760284.4, Extended European Search Report mailed Jan. 9, 2025, 6 pages.
(Continued)

*Primary Examiner* — Lisa Hashem

(57) ABSTRACT

Methods, systems, and apparatus, including computer programs encoded on a computer storage medium, for implementing a spam telephone call reducer are disclosed. In one aspect, a method includes the actions of receiving first telephone call data that reflects telephone calls received by a first user and second telephone call data that reflects telephone calls received by a second user. The actions further include comparing the first telephone call data and the second telephone call data. The actions further include determining that the first user received more spam telephone calls than the second user. The actions further include determining a first characteristic of the first user and a second characteristic of the second user. The actions further include determining an action that increases a similarity of the first characteristic to the second characteristic. The actions further include performing the action on the first characteristic.

20 Claims, 5 Drawing Sheets

Related U.S. Application Data continuation of application No. 17/184,467, filed on Feb. 24, 2021, now Pat. No. 11,711,464.

(58) Field of Classification Search
CPC ............. H04L 63/0236; H04L 63/1433; H04L 65/1079
See application file for complete search history.

(56) References Cited

U.S. PATENT DOCUMENTS

| | | | | |
|---|---|---|---|---|
| 9,674,350 | B2 * | 6/2017 | Byrne | H04M 3/42314 |
| 9,729,727 | B1 | 8/2017 | Zhang | |
| 10,110,738 | B1 | 10/2018 | Sawant et al. | |
| 10,182,034 | B1 | 1/2019 | Koster | |
| 10,194,023 | B1 | 1/2019 | Kong et al. | |
| 10,212,277 | B2 | 2/2019 | Kuang | |
| 10,313,516 | B2 | 6/2019 | Ansari | |
| 10,455,085 | B1 | 10/2019 | Roundy et al. | |
| 10,477,403 | B2 | 11/2019 | Flaks et al. | |
| 10,785,369 | B1 | 9/2020 | Dashevskiy et al. | |
| 11,233,900 | B1 * | 1/2022 | Zaki | H04M 3/436 |
| 11,711,464 | B2 | 7/2023 | Ives | |
| 11,729,313 | B2 * | 8/2023 | Garg | H04M 3/436 455/410 |
| 12,028,481 | B2 * | 7/2024 | Ives | H04M 3/4365 |
| 2001/0011247 | A1 | 8/2001 | O'Flaherty et al. | |
| 2003/0105827 | A1 | 6/2003 | Tan et al. | |
| 2005/0259667 | A1 * | 11/2005 | Vinokurov | H04L 51/212 379/112.03 |
| 2006/0026242 | A1 | 2/2006 | Kuhlmann et al. | |
| 2009/0202061 | A1 | 8/2009 | Charzinski et al. | |
| 2011/0294478 | A1 * | 12/2011 | Trivi | H04M 3/436 455/415 |
| 2012/0099711 | A1 | 4/2012 | Tully et al. | |
| 2017/0019534 | A1 * | 1/2017 | Qin | H04M 3/2218 |
| 2017/0180983 | A1 | 6/2017 | Wang | |

OTHER PUBLICATIONS

International Patent Application No. PCT/US2022/017358, International Search Report and Written Opinion mailed Jun. 7, 2022, 9 pages.
U.S. Appl. No. 17/184,467, Notice of Allowance mailed Mar. 8, 2023, 24 pages.
U.S. Appl. No. 18/218,567, Notice of Allowance mailed Apr. 17, 2024, 8 pages.

* cited by examiner

SPAM TELEPHONE CALL REDUCER

CROSS-REFERENCE TO RELATED APPLICATIONS

This application is a continuation of and claims priority under 35 U.S.C. § 120 to U.S. patent application Ser. No. 18/218,567 filed on Jul. 5, 2023, entitled "Spam Telephone Call Reducer" by Derrick Ives, which is a continuation of U.S. patent application Ser. No. 17/184,467 filed on Feb. 24, 2021, entitled "Spam Telephone Call Reducer" by Derrick Ives, both of which are incorporated by reference.

BACKGROUND

A spam telephone call may be any type of unwanted or unsolicited telephone call. This may include prank telephone calls, telemarketing telephone calls, and/or silent calls. In some instances, a called party may identify the spam call before answering the telephone call based on the caller identification information. In other instances, a called party may answer the telephone call and then determine that the telephone call is spam.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Spam telephone calls can be a source of frustration for users and service providers. A user may be interrupted by a ringing telephone. After answering the telephone call, the user may realize that the telephone call is spam and promptly end the telephone call. Without data to identify spam telephone calls from other telephone calls, the service provider may be connecting many spam telephone calls each day. Even if the spam telephone calls are a small fraction of the overall traffic managed by a service provider, the amount of resources used to receive, route, and terminate spam telephone calls can be significant for service providers that handle billions of telephone calls each day.

Some approaches to manage spam telephone calls may involved attempting to identify patterns in the callers. A service provider may analyze caller's location, phone number, date and time of call, calling history, and other factors in an attempt to identify spam telephone calls before ringing a callee's phone. This may help to identify spam telephone calls based on the actions of the caller, but there may be actions or inactions that the callee may be purposely or inadvertently taking that may increase or decrease the likelihood of receiving a spam telephone call.

A service provider may identify spam telephone calls that use its network by receiving feedback from users and/or by analyzing completed telephone calls for characteristics of spam calls. The service provider may determine the number of spam calls that each user and associated telephone number receives and identify characteristics of each user. These characteristics may include the users' locations, calling history, network activity, actions, and/or other factors. The service provider may identify characteristics that may be correlated with higher and lower frequencies of spam calls. The service provider may provide recommendations to those users who experience higher frequencies of spam calls based on the characteristics of users who experience lower frequencies of spam calls. In some instances, the service provider may automatically implement some of those recommendations. The service provider may also determine what phone number to assign to a new device based on the previous spam calls received by that phone number. For example, IOT devices may receive a phone number that previously experienced higher frequencies of spam calls.

Figure 1:
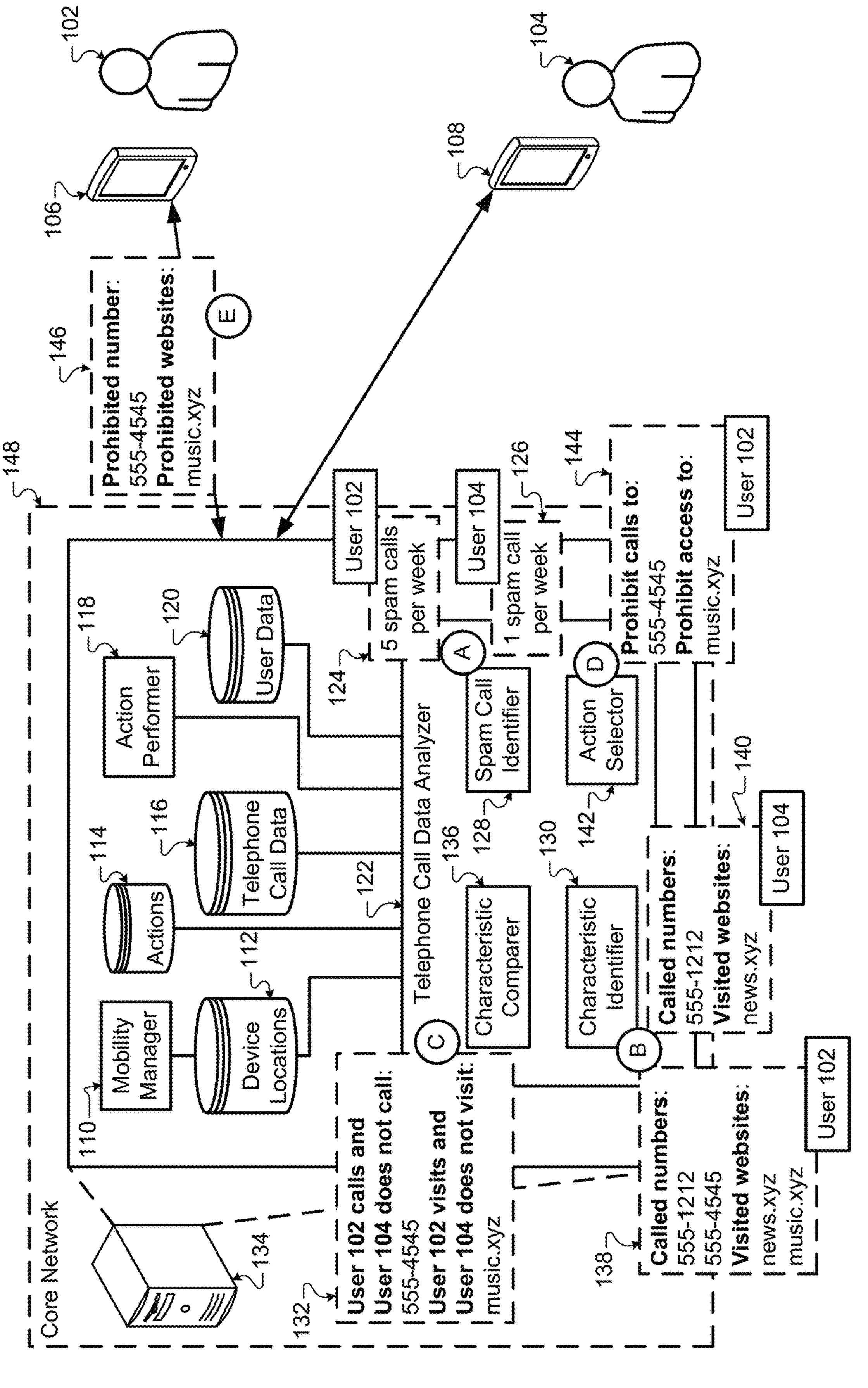
FIG. 1 illustrates an example system that is configured to determine that a first user receives more spam telephone calls than a second user and performing actions to reduce the number of spam telephone calls received by the first user.

FIG. 1 illustrates an example system 100 that is configured to determine that a first user 102 receives more spam telephone calls than a second user 104 and performing actions to reduce the number of spam telephone calls received by the first user. Briefly, and as described in more detail below, the system 100 includes a server 134 that is configured to analyze the telephone call data 116 to identify spam telephone calls received by the first user 102 and the second user 104. The server 134 identifies various characteristics of the first user 102 and the second user 104, and performs an action to change the characteristics of the first user 102 to be more similar to the second user 104 in order to reduce the number of spam telephone calls that the first user 102 receives. FIG. 1 includes various stages A through E that may illustrate the performance of actions and/or the movement of data between various components of the server 134 and/or between the server 134 and other computing devices. The system 100 may perform these stages in any order.

In more detail, the user 102 may use the computing device 106 to place and receive telephone calls, and the user 104 may use the computing device 108 to place and receive telephone calls. Some of the telephone calls received by the user 102 and/or the user 104 may be spam telephone calls. A spam telephone call may include unwanted and/or unsolicited telephone calls such as prank calls, telemarketing calls, scam calls, silent calls, and/or any other similar nuisance call. When the user 102 or 104 receives a spam telephone call, it may not be apparent to the user 102 or 104 that the incoming telephone call is a spam telephone call. A phone number and/or a name may appear on the screen of the computing device 106 or 108. The user 102 or 104 may choose to answer the telephone call, in which case, the user 102 or 104 may end the telephone call soon after answering, such as within fifteen seconds. In some instances, the user 102 or 104 may talk and/or listen to the calling party and the telephone call may last longer than one where the user 102 or 104 ends the telephone call soon after answering. In some cases, the user 102 or 104 may not answer the telephone call, in which case, the calling party may connect to the voicemail system. In this case, the calling party may or may not leave a voicemail. The user 102 or 104 may receive multiple calls from the same phone number. If the user 102 or 104 determined that the initial phone call from a phone number was a spam telephone call, then the user 102 or 104 may decide not to answer subsequent calls from the same phone number. In some instances, the computing devices 106 and 108 may be configured to block subsequent telephone calls from phone numbers identified as callers of spam telephone calls.

The server 134 may include telephone call data 116 that is related to the incoming and outgoing telephone calls of the computing devices 106 and 108 and other computing devices. The telephone call data 116 may include data indicating the date, time, and/or the duration of the telephone call. The telephone call data 116 may also include data indicating whether the called party answered the telephone call, whether the voicemail system answered the telephone call, and/or whether the calling party left a voicemail. The telephone call data 116 may also include data identifying the calling party and data identifying the called party. The data identifying the calling party may include a phone number of the calling party, a name of the calling party, a geographic location of the calling party at the time of the call, a network location of the calling party at the time of the call, data identifying a computing device used by the calling party, and/or any other similar information of the calling party. The data identifying the called party may include a phone number of the called party, a name of the called party, a geographic location of the called party at the time of the call, a network location of the called party at the time of the call, data identifying a computing device used by the called party and/or any other similar information of the called party.

The users 102 and 104 may use the computing devices 106 and 108 for more than placing and receiving telephone calls. The computing devices 106 and 108 may be any type of device that is configured to communicate with other computing devices through a wired or wireless connection. The computing devices 106 and 108 may utilize a voice communication channel for telephone calls and a data communication channel for other communications. As an example, the computing devices 106 and/or 108 may be mobile phones. The users 102 and 104 may use the computing devices 106 and 108 to access the internet through various mobile phone applications that utilize the data communication channel. The computing devices 106 and/or 108 may also be tablets, laptop computers, desktop computers, wearable devices, and/or any other similar device. In some implementations, the computing devices 106 and 108 may use the data communication channel for telephone calls, such as voice over internet protocol calls.

The server 134 may include user data 120 that is related to the incoming and outgoing data of the computing devices 106 and 108 and other computing devices. The user data 120 may be related to the incoming and outgoing data of the data communication channel. The user data 120 may include a date, time, duration of the data exchanged, and/or the amount of data exchanged. The user data 120 may also include data indicating a geographic and network location of the computing device with which the computing devices 106 or 108 was communicating. The user data 120 may include data identifying an application on the computing devices 106 or 108 that interacted with the data exchanged. In some implementations, the user data 120 may also include configurations that the user 102 and/or 104 has set or preset configurations on the computing devices 106 and/or 108. These configurations may include whether the computing devices 106 and/or 108 are set to block certain phone numbers, block calls during certain times of the day, and/or any other similar phone call related configurations.

The server 134 may be included in or in communication with a network such as a wireless carrier network that provides voice and data communication services to multiple devices, such as the computing devices 102 and 104 and other devices. The wireless carrier network may provide telecommunication and data communication in accordance with one or more technical standards, such as Enhanced Data Rates for GSM Evolution (EDGE), Wideband Code Division Multiple Access (W-CDMA), High Speed Packet Access (HSPA), Long Term Evolution (LTE), 5th Generation (5G) wireless systems, CDMA-2000 (Code Division Multiple Access 2000), and/or other similar standards. In some implementations, the server 134 may communicate with the computing devices 102 and 104 and other devices using a Wi-Fi network, short range radio, infrared communication, and/or any other similar communication technique.

The wireless carrier network may include a radio access network and a core network 148. The radio access network may include multiple base stations. The multiple base stations are responsible for handling voice and/or data traffic between multiple devices, such as the computing devices 102 and 104 and other devices and the core network 148. Accordingly, each of the base stations may provide a corresponding network cell that delivers telecommunication and data communication coverage. The core network 148 may use the network cells to provide communication services to the multiple subscriber devices. For example, the core network 148 may connect the multiple devices to other telecommunication and data communication networks, such as the Internet and the public switched telephone network (PSTN). The base stations are responsible handling voice and data traffic between devices and the core network 148. In some implementations, the base stations may be in the form of eNodeB nodes. Each eNodeB node may include a base transceiver system (BTS) that communicates via an antenna system over an air-link with one or more devices that are within range. The antenna system of an eNodeB node may include multiple antennas that are mounted on a radio tower to provide a coverage area that is referred to as a "cell." The BTS may send radio signals to devices and receive radio signals from devices.

The server 134 may include a mobility manager 110. The mobility manager 110 may be configured to monitor the location of the computing devices 106 and 108 that are connected to the server 134 through a wireless base station. The location of the computing devices 106 and 108 may include the location of the wireless base station to which the computing devices 106 and 108 are connected and/or GPS data received from the computing devices 106 and 108. The mobility manager 110 may store the location data in the device locations 112 of the server 134.

In some implementations, the mobility manager 110 may determine the location of a computing devices 106 and 108 at periodic intervals, such as every five seconds. In some implementations, the mobility manager 110 may determine the location of a computing devices 106 and 108 when the computing devices 106 and 108 connect to a different wireless base station and/or provide updated GPS data. In some implementations, the mobility manager 110 may determine the location of the computing devices 106 and 108 relative to the base station with which the computing device is communicating. In this case, the mobility manager 110 may determine the relative location based on data collected from the base station such as signal strength and direction of communications between the computing devices 106 and 108 and the base station. The mobility manager 110 may also determine the relative location based on the location of the base station and GPS data received from the computing devices 106 and 108. The relative location data may include a distance between the computing devices 106 and 108 and the base station, the cardinal direction from the base station to the computing devices 106 and 108, and/or any other similar measurements.

The server 134 may include a telephone call data analyzer 122 that is configured to analyze the telephone call data 116 and/or the user data 120. The telephone call data analyzer 122 may identify the spam telephone calls received by the computing devices 106 and 108 and other computing devices. The telephone call data analyzer 122 may determine the characteristics of the users 102 and 104 and/or the computing devices 106 and 108. The telephone call data analyzer 122 may identify those users and computing devices that receive fewer spam telephone calls than other users and computing devices. The telephone call data analyzer 122 may determine actions to adjust those characteristics of the users and computing devices that receive more spam telephone calls to be more similar to the characteristics of the users and computing devices that receive fewer spam telephone calls.

The telephone call data analyzer 122 may include a spam call identifier 128. In stage A, the spam call identifier 128 may analyze the telephone call data 116 and/or the user data 120 and identify the spam telephone calls received by the computing devices 106 and 108 and other computing devices. In some implementations, the users 102 and 104 may provide data indicating whether a telephone call was a spam telephone call by providing input to the computing devices 106 and 108. The spam call identifier 128 may use a combination of rules and/or models to determine whether a telephone call was likely a spam telephone call. For example, the spam call identifier 128 may use a rule that specifies that a telephone call is likely a spam telephone call if the called party has not received a call from the phone number during the past year, the duration of the telephone call was less than one minute, and the called party ended the telephone call. This rule may be configured to identify telephone calls where the called party likely hung up the telephone after determining that the telephone call was a spam telephone call. This rule may also identify non-spam telephone calls where the calling party dialed a wrong number or wanted to verify that the number is active. Because of this, it may be beneficial to user additional rules and/or models to identify likely spam telephone calls. As another example, the spam call identifier 128 may determine that a telephone call is likely not a spam telephone call if the duration of the telephone call was greater than ten minutes.

The models that the spam call identifier 128 may use to determine whether a telephone call was likely a spam telephone call may include models trained using machine learning and historical data. The historical data may include data similar to the telephone call data 116 and labels indicating whether a previous telephone call was a spam telephone call or not a spam telephone call. The historical data may include, for the previous telephone calls, a date, time, and/or the duration of the telephone call. The historical data may include data indicating whether the called party answered the telephone call, whether the voicemail system answered the telephone call, and/or whether the calling party left a voicemail. The historical data may also include data identifying the calling party and data identifying the called party. The data identifying the calling party may include a phone number of the calling party, a name of the calling party, a geographic location of the calling party at the time of the call, a network location of the calling party at the time of the call, data identifying a computing device used by the calling party, and/or any other similar information of the calling party. The data identifying the called party may include a phone number of the called party, a name of the called party, a geographic location of the called party at the time of the call, a network location of the called party at the time of the call, data identifying a computing device used by the called party and/or any other similar information of the called party.

The models may be configured to receive data related to a telephone call and output data indicating whether the telephone call was likely a spam telephone call or not likely a spam telephone call. In some implementations, a model may be configured to output a confidence score that indicates a likelihood that the output of the model is accurate. An example model may be configured to receive, for a telephone call, the date, time, and duration of the telephone call, a phone number of the called party, a phone number of the calling party, and data identifying the device used by the calling party. The model may output data indicating whether that telephone call was likely a spam telephone call or not likely a spam telephone call. In the example of FIG. 1, the spam call identifier 128 may determine that the phone number of user 102 receives five spam telephone calls per week, and the phone number of user 104 receives one spam telephone call per week.

The spam call identifier 128 may be configured to rank the phone number of the user 102, the phone number of the user 104, and other phone numbers according to the number of spam telephone calls received. The spam call identifier 128 may rank the phone numbers according to the spam telephone calls received over a period of time, such as the previous month, the previous twelve months, or another similar time period. The spam call identifier 128 may rank the phone numbers according to the spam telephone calls received while each phone number was assigned to a current customer. When a phone number is assigned to a new customer, the number of spam telephone calls received may reset. The spam call identifier 128 may rank the phone numbers according to the overall number of spam telephone calls received even while phone numbers were assigned to different customers. The spam call identifier 128 may rank the phone numbers according to the percentages of spam telephone calls to all received telephone calls or according to the absolute number of spam telephone calls. In some implementations, the spam call identifier 128 may rank users according to the number of received spam telephone calls. The number of spam telephone calls received by a user may include those received through different phone numbers, which may include a previous phone number and a current phone number.

In some implementations, the spam call identifier 128 may classify the phone number of the user 102, the phone number of the user 104, and other phone numbers according to the number of spam telephone calls received. The spam call identifier 128 may classify the phone numbers into various percentile rankings based on the number of spam telephone calls received. For example, the spam call identifier 128 may assign the phone numbers into quartiles with the lower quartile receiving the fewest spam telephone calls and the upper quartile receiving the most spam telephone calls.

The server 134 may include a characteristic identifier 130. In stage B, the characteristic identifier 130 may analyze the telephone call data 116, the device locations 112, and/or the user data 120 to identify various characteristics of the user 102, the user 104, and other users. The characteristics of a user may include the telephone numbers called by the user, the websites visited by the user, applications used by the user, the locations of the user when placing and/or receiving telephone calls, the locations of the user when visiting various websites and/or using various applications, the phone number of the user, a time period that the phone number has been assigned to the user, whether the user subscribes to or has activated a spam telephone blocking service, how long the user has been a customer of the wireless carrier, whether the user is a prepaid customer or a postpaid customer, the type of computing device used to receive telephone calls, whether the user is a customer through a mobile virtual network operator, the service plan of the user, a time period that the phone number was unused before assigning to the user, and/or any other similar characteristic.

In the example of FIG. 1, the characteristic identifier 130 may determine the characteristics 138 for the phone number of the user 102. The characteristics 138 may indicate that the phone number of the user 102 called the phone numbers 555-1212 and 555-4545, and the computing device 106 accessed the websites news.xyz and music.xyz. The computing device 106 may be the device assigned to the phone number of the user 102. The characteristic identifier 130 may determine the characteristics 140 for the phone number of the user 104. The characteristics 140 may indicate that the phone number of the user 104 called the phone numbers 555-1212, and the computing device 108 accessed the websites news.xyz. The computing device 108 may be the device assigned to the phone number of the user 104.

The server 134 may include a characteristic comparer 136. In stage C, the characteristic comparer 136 may compare the characteristics 138 of the phone number of the user 102, the characteristics 140 of the phone number of the user 104, and characteristics of other phone numbers. The characteristic comparer 136 may compare the characteristics of phone numbers in different classifications. For example, the characteristic comparer 136 may compare the characteristics of the phone numbers in the quartile with the fewest spam telephone calls to the characteristics of the phone numbers in the other three quartiles. The characteristic comparer 136 may identify differences in the characteristics between the characteristics of the phone numbers. For example, the characteristic comparer 136 may compare the phone numbers called from phone number of the user 102 to the phone numbers called from the phone number of the user 104.

In some implementations, the characteristic comparer 136 may be configured to identify the characteristics that are different between those phone numbers that receive fewer spam telephone calls than other phone numbers. For example, the characteristic comparer 136 may compare the locations of the computing devices that receive fewer spam telephone calls to the locations of other computing devices. The locations may be the locations where the computing devices are located when receiving spam and non-spam telephone calls, when placing telephone calls, and/or when using an application on the computing device. The characteristic comparer 136 may determine that the computing devices that receive fewer spam telephone calls are not in a specific location when placing telephone calls when compared to the computing devices that receive more spam telephone calls. As another example, the characteristic comparer 136 may compare the phone numbers of the computing devices that receive fewer spam telephone calls to the phone numbers of the computing devices that receive more spam telephone calls. The characteristic comparer 136 may determine that the computing devices that receive fewer spam telephone calls do not have the form xxx-555-xxxx while the computing devices that receive more spam telephone calls have the form xxx-555-xxxx.

In some implementations, the characteristic comparer 136 may be configured to compare the characteristics 138 of the phone number of the user 102 and/or the characteristics 140 of the phone number of the user 104 to predetermined characteristics. The predetermined characteristics may be those that have previously corresponded to phone numbers that received fewer numbers of spam telephone calls than other phone numbers. In some instances, the predetermined characteristics may be related to phone numbers that did not received spam telephone calls. The predetermined characteristics may include data fields to the characteristics 138 and/or the characteristics 140. These data fields may include called numbers, visited websites, locations of called parties, location of the computing device during placing phone calls, and/or any other similar data field described above.

In the example of FIG. 1, the characteristic comparer 136 may receive, from the spam call identifier 128, data indicating that the phone number of the user 102 received five spam telephone calls per week and the phone number of the user 104 received one spam telephone call per week. The characteristic comparer 136 may receive, from the characteristic identifier 130, the characteristics 138 that indicate the phone number of the user 102 called the phone numbers 555-1212 and 555-4545, and the computing device 106 accessed the websites news.xyz and music.xyz. The characteristic comparer 136 may receive, from the characteristic identifier 130, the characteristics 140 that indicate the phone number of the user 104 called the phone numbers 555-1212, and the computing device 108 accessed the websites news.xyz.

Based on the indication that the phone number of the user 102 receives more spam telephone calls than the phone number of the user 104, the characteristic comparer 136 may compare the characteristics 138 to the characteristics 140. The characteristic comparer 136 may identify the differences 132 between the characteristics 138 to the characteristics 140. The differences 132 may indicate that the phone number of the user 102 calls and the phone number of the user 104 does not call the phone number 555-4545. The differences 132 may also indicate that the computing device 106 visits and the computing device 108 does not visit the website music.xyz.

The server 134 may include an action selector 142. In stage D, the action selector 142 may select an action 144 from stored actions 114. The action selector 142 may select an action in order to make the characteristics of a computing device or user of a phone number that receives more spam telephone calls more similar to the characteristics of a computing device or user of a phone number that receives fewer spam telephone calls. For example, the action selector 142 may select an action 144 so that the characteristics 138 of the user 102 are more similar to the characteristics 140 of the user 104 because the phone number of the user 102 received more spam telephone calls than the phone number of the user 104. In some implementations, the action selector 142 may identify an action 144 for the user 102 and/or the computing device 106 based on the characteristics 138. The action selector 142 may use rules and/or models to analyze characteristics 138 to identify the action 144.

The action selector 142 may use rules and/or models to select an action 144 from the actions 114. A rule may indicate to select the action of preventing calls to phone numbers that may be called from phone numbers that receive more spam telephone calls than other phone numbers. Another rule may indicate to select the action of preventing access to applications and/or websites that may be accessed from computing devices that are associated with phone numbers that receive more spam telephone calls than other phone numbers. Some additional actions included in the actions 114 may include reassigning or modifying a phone number on a temporary or permanent basis, preventing outgoing calls while a computing device is in a particular location, preventing incoming calls while a computing device is in a particular location, removing a phone number from a website or directory, enrolling a user in a spam telephone call blocking service, and/or any other similar action. In some instances, a website may store data related to each user that accesses the website. This data may be collected from various sources and may include data that relates a computing device to a phone number. When visiting a website, the user 102 may provide an indication that the computing device 106 is active and, therefore, the corresponding phone number that the website has associated with that computing device 106 or user 102 may also be active.

A model may be configured to receive the differences 132 from the characteristic comparer 136. The model may be configured to output an action 144 that is included in the actions 114 in response to receiving the differences 132. For example, the model may output data indicating to prevent outgoing calls by a phone number included in the differences 132. In some implementations, a model may be configured to receive telephone call data 116 and/or user data 120 for a phone number and output an action for reducing the number of received spam telephone calls. For example, the model may receive, from the telephone call data 116, a telephone call record of the phone number of the user 102 and, from the user data 120, a data usage record of the computing device 106. The model may output an action from the actions 114 for reducing the number of received spam telephone calls received by the phone number of the user 102. As another example, the model may receive, from the characteristic identifier 130, the characteristics 138 of the phone number of the user 102. The model may output an action from the actions 114 for reducing the number of received spam telephone calls received by the phone number of the user 102. As another example, the model may receive, from the characteristic identifier 130, the characteristics 138 of the phone number of the user 102 and the characteristics 140 of the phone number of the user 104, and receive spam call data 124 and spam call data 126 from the spam call identifier 128. The model may output an action from the actions 114 for reducing the number of received spam telephone calls received by the phone number of the user 102.

The models may be trained using machine learning and historical data. Different models may be trained using different portions of the historical data and may be configured to receive different types of data as inputs. For example, a first model may be trained using data similar to the telephone call data 116 and/or user data 120. This data may include an action taken in attempting to reduce the number of spam telephone calls received in addition to the number of spam telephone calls before and after performance of the action. The model may be configured to receive the telephone call data and/or user data for a given phone number and output an action to perform to reduce the number of spam telephone calls. As another example, a second model may be trained using data similar to the characteristics 138 for multiple phone numbers. The training data may include an action taken in attempting to reduce the number of spam telephone calls received in addition to the number of spam telephone calls before and after performance of the action.

In the example of FIG. 1, the action selector 142 may use models and/or rules to analyze the differences 132 between the characteristics 138 of the phone number of the user 102 and the characteristics 140 of the phone number of the user 104. The differences 132 may indicate that the phone number of the user 102 calls and the phone number of the user 104 does not call the phone number 555-4545. The differences 132 may also indicate that the computing device 106 visits and the computing device 108 does not visit the website music.xyz. In some implementations, the action selector 142 may also receive the spam call data 124 and spam call data 126 from the spam call identifier 128. The action selector 142 may identify the action 144 from the actions 114 indicating to prohibit phone calls from the phone number of the user 102 to the phone number 555-4545 and to prohibit a computing device of the phone number of the user 102 from accessing the website music.xyz.

The server 134 may include an action performer 118. In stage E, the action performer 118 may receive the action 144 from the action selector 142. The action performer 118 may perform the action by providing instructions 146 to the computing device 106 associated with the phone number of the user 102. The computing device 106 may receive the instructions 146, implement the instructions 146, and provide a confirmation to the action performer 118 indicating implementation of the instructions 146. In some implementations, computing device 106 may receive the instructions 146 and output an indication of the instructions 146 on the display of the computing device 106. The indication of the instructions 146 may provide the user 102 the option of complying with the instructions 146 or rejecting the instructions 146. If the user 102 selects the option of complying with the instructions 146, then the computing device 106 may comply with the instructions 146 and provide an indication to the server 134. If the user 102 selects the option of rejecting the instructions 146, then the computing device 106 may provide an indication to the server 134 indicating the rejection.

In the example of FIG. 1, the action performer 118 may provide the instructions 146 indicating to prevent the computing device 106 from calling the phone number 555-4545 and to prevent the computing device 106 from accessing the website music.xyz. In some implementations, the computing device 106 may display an indication that the computing device 106 has been instructed to prevent calls to 555-4545 and access to music.xyz. In this instance, then user 102 may comply with the instructions 146 or reject the instructions. In some implementations, the computing device 106 may present a warning to the user 102 at the time that the user 102 attempts to call 555-4545 or access music.xyz. The warning may indicate that performing those actions may increase the likelihood of receiving spam telephone calls. The user 102 may act on those warnings by cancelling the action or dismiss the warnings.

The telephone call data analyzer 122 may continue to identify the spam telephone calls received the computing devices 106 and 108 after providing the instructions 146 to the computing device 106. The telephone call data analyzer 122 may determine that the phone number of the user 102, the phone number of the user 104, and/or another phone number receive more spam telephone calls than other phone numbers. In this case, the telephone call data analyzer 122 may perform stages A through D again and identify an additional action to perform to reduce the number of spam telephone calls received by a phone number.

In some implementations, the functionality of the server 134 may be implemented by the computing devices 106 and/or 108. For example, the computing device 106 may implement a telephone call data analyzer and analyze telephone call data and user data for the computing device and user 102. The computing device 106 may receive telephone call data and user data related to other computing devices for comparison to the telephone call data analyzer and analyze telephone call data and user data for the computing device and user 102. In some implementations, the computing device 106 may store predetermined telephone call data and user data for computing devices and phone numbers that receive few or no spam telephone calls. In some implementations, the computing device 106 may analyze the telephone call data and user data for the computing device and user 102 using rules and/or models that are configured to output actions to reduce spam telephone calls without comparing the telephone call data and user data to telephone call data and user data of other computing devices and phone numbers.

Figure 2:
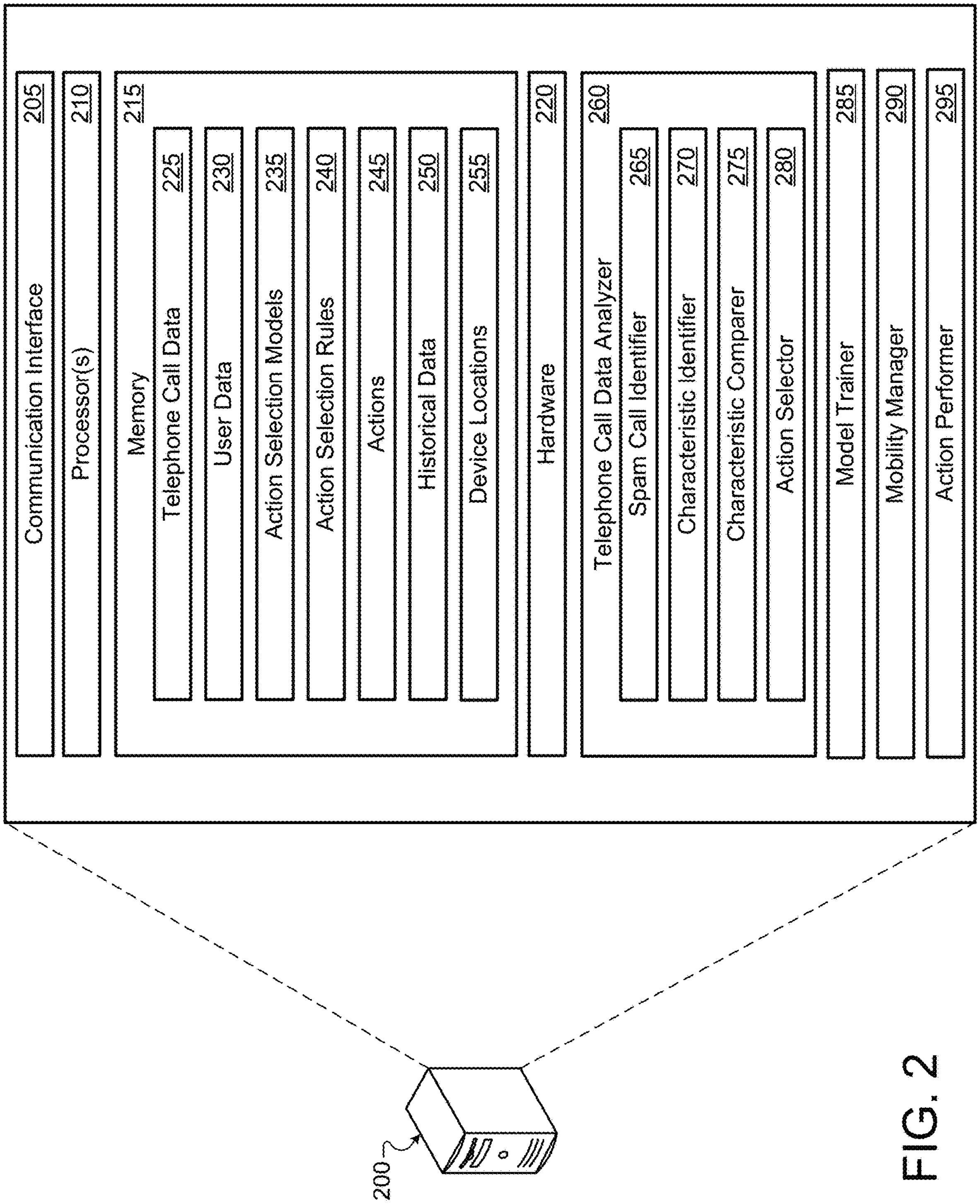
FIG. 2 illustrates an example server that is configured to identify actions that reduce the number of spam telephone calls received by a user.

FIG. 2 illustrates an example server 200 that is configured to identify actions that reduce the number of spam telephone calls received by a user. The server 200 may be any type of computing device that is configured to communicate with other computing devices. The server 200 may be integrated into a wireless carrier network or interact with a wireless carrier network. The server 200 may communicate with other computing devices using a wide area network, a local area network, the internet, a wired connection, a wireless connection, and/or any other type of network or connection. The wireless connections may include Wi-Fi, short-range radio, infrared, and/or any other wireless connection. The server 200 may be similar to the server 134 of FIG. 1. Some of the components of the server 200 may be implemented in a single computing device or distributed over multiple computing devices. Some of the components may be in the form of virtual machines or software containers that are hosted in a cloud in communication with disaggregated storage devices.

The server 200 may include a communication interface 205, one or more processors 210, memory 215, and hardware 220. The communication interface 205 may include communication components that enable the server 200 to transmit data and receive data from devices connected to the wireless carrier network. The communication interface 205 may include an interface that is configured to communicate with base stations of a wireless carrier network. The communication interface 205 may receive data that other devices transmit to the base stations and/or transmit data to the base stations for transmission to the other devices. In some implementations, the communication interface 205 may be configured to communicate over a wide area network, a local area network, the internet, a wired connection, a wireless connection, and/or any other type of network or connection. The wireless connections may include Wi-Fi, short-range radio, infrared, and/or any other wireless connection.

The hardware 220 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 215 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. In some implementations, the data stored in the memory 215 may stored externally from the server 200.

The one or more processors 210 may implement a mobility manager 290. The mobility manager 290 may be similar to the mobility manager 110 of FIG. 1. The mobility manager 290 may be configured to monitor the location of a computing device that is connected to the server 200 through a wireless base station. The location of the computing device may include the location of the wireless base station to which the computing device is connected and/or GPS data received from the computing device. The mobility manager 290 may store the location data in the device locations 255 of the server 200.

In some implementations, the mobility manager 290 may determine the location of a computing device at periodic intervals, such as every five seconds. In some implementations, the mobility manager 290 may determine the location of a computing device when the computing device connects to a different wireless base station and/or provides updated GPS data. In some implementations, the mobility manager 290 may determine the location of the computing device relative to the base station with which the computing device is communicating. In this case, the mobility manager 290 may determine the relative location based on data collected from the base station such as signal strength and direction of communications between the computing device and the base station. The mobility manager 290 may also determine the relative location based on the location of the base station and GPS data received from the computing device. The relative location data may include a distance between the computing device and the base station, the cardinal direction from the base station to the subscriber device, and/or any other similar measurements.

The memory 215 may store telephone call data 225 that is related to the incoming and outgoing telephone calls of various computing devices. The telephone call data 225 may be similar to the telephone call data 116 of FIG. 1. The telephone call data 225 may include data indicating the date, time, and/or the duration of a telephone call. The telephone call data 225 may also include data indicating whether the called party answered the telephone call, whether the voicemail system answered the telephone call, and/or whether the calling party left a voicemail. The telephone call data 225 may also include data identifying the calling party and data identifying the called party. The data identifying the calling party may include a phone number of the calling party, a name of the calling party, a geographic location of the calling party at the time of the call, a network location of the calling party at the time of the call, data identifying a computing device used by the calling party, and/or any other similar information of the calling party. The data identifying the called party may include a phone number of the called party, a name of the called party, a geographic location of the called party at the time of the call, a network location of the called party at the time of the call, data identifying a computing device used by the called party and/or any other similar information of the called party.

The memory may store user data 230 that is related to the data communications and related actions of the various computing devices communicating with other computing devices through the server 200. The user data 230 includes data related to the incoming and outgoing data of the computing devices. The user data 230 may be related to the incoming and outgoing data of the data communication channel. The user data 230 may include a date, time, duration of the data exchanged, and/or the amount of data exchanged. The user data 230 may also include data indicating a geographic and network location of the other computing device with which the computing device. The user data 120 may include data identifying an application on the computing device that interacted with the data exchanged. The user data 230 may include data identifying the computing devices involved in the data exchange.

The one or more processors 210 may implement a telephone call data analyzer 260. The telephone call data analyzer 260 may be similar to the telephone call data analyzer 122 of FIG. 1. The telephone call data analyzer 260 may identify the spam telephone calls received by various computing devices. The telephone call data analyzer 260 may determine the characteristics of the users of the computing devices and/or of the computing devices. The telephone call data analyzer 260 may identify those users and computing devices that receive fewer spam telephone calls than other users and computing devices. The telephone call data analyzer 260 may determine actions to adjust those characteristics of the users and computing devices that receive more spam telephone calls to be more similar to the characteristics of the users and computing devices that receive fewer spam telephone calls.

The telephone call data analyzer 260 may include a spam call identifier 265. The spam call identifier 265 may be configured to analyze the telephone call data 116 and/or the user data 120 and identify the spam telephone calls received by computing devices. In some implementations, the users of the computing devices may provide data indicating whether a telephone call was a spam telephone call. The spam call identifier 265 may use a combination of rules and/or models to determine whether a telephone call was likely a spam telephone call. For example, the spam call identifier 265 may use a rule that specifies that a telephone call is likely a spam telephone call if the called party has not received a call from the phone number during the past year, the duration of the telephone call was less than one minute, and the called party ended the telephone call. This rule may be configured to identify telephone calls where the called party likely hung up the telephone after determining that the telephone call was a spam telephone call. As another example, the spam call identifier 265 may determine that a telephone call is likely not a spam telephone call if the duration of the telephone call was greater than ten minutes.

The models that the spam call identifier 265 may use to determine whether a telephone call was likely a spam telephone call may include models trained using machine learning and historical data. The historical data may include data similar to the telephone call data 116 and labels indicating whether a previous telephone call was a spam telephone call or not a spam telephone call. The historical data may include, for the previous telephone calls, a date, time, and/or the duration of the telephone call. The historical data may include data indicating whether the called party answered the telephone call, whether the voicemail system answered the telephone call, and/or whether the calling party left a voicemail. The historical data may also include data identifying the calling party and data identifying the called party. The data identifying the calling party may include a phone number of the calling party, a name of the calling party, a geographic location of the calling party at the time of the call, a network location of the calling party at the time of the call, data identifying a computing device used by the calling party, and/or any other similar information of the calling party. The data identifying the called party may include a phone number of the called party, a name of the called party, a geographic location of the called party at the time of the call, a network location of the called party at the time of the call, data identifying a computing device used by the called party and/or any other similar information of the called party.

The models may be configured to receive data related to a telephone call and output data indicating whether the telephone call was likely a spam telephone call or not likely a spam telephone call. In some implementations, a model may be configured to output a confidence score that indicates a likelihood that the output of the model is accurate. An example model may be configured to receive, for a telephone call, the date, time, and duration of the telephone call, a phone number of the called party, a phone number of the calling party, and data identifying the device used by the calling party. The model may output data indicating whether that telephone call was likely a spam telephone call or not likely a spam telephone call.

The spam call identifier 265 may be configured to rank the phone numbers according to the number of spam telephone calls received. The spam call identifier 265 may rank the phone numbers according to the spam telephone calls received over a period of time, such as the previous month, the previous twelve months, or another similar time period. The spam call identifier 265 may rank the phone numbers according to the spam telephone calls received while each phone number was assigned to a current customer. When a phone number is assigned to a new customer, the number of spam telephone calls received may reset. The spam call identifier 265 may rank the phone numbers according to the overall number of spam telephone calls received even while phone numbers were assigned to different customers. The spam call identifier 265 may rank the phone numbers according to the percentages of spam telephone calls to all received telephone calls or according to the absolute number of spam telephone calls. In some implementations, the spam call identifier 128 may rank users according to the number of received spam telephone calls. The number of spam telephone calls received by a user may include those received through different phone numbers, which may include a previous phone number and a current phone number.

In some implementations, the spam call identifier 265 may classify a phone number according to the number of spam telephone calls received. The spam call identifier 265 may classify the phone numbers into various percentile rankings based on the number of spam telephone calls received. For example, the spam call identifier 265 may assign the phone numbers into quartiles with the lower quartile receiving the fewest spam telephone calls and the upper quartile receiving the most spam telephone calls.

The telephone call data analyzer 260 may include a characteristic identifier 270. The characteristic identifier 270 may be similar to the characteristic identifier 130 of FIG. 1. The characteristic identifier 270 may be configured to analyze the telephone call data 116, the device locations 112, and/or the user data 120 to identify various characteristics of the users of the computing devices. The characteristics of a user may include the telephone numbers called by the user, the websites visited by the user, applications used by the user, the locations of the user when placing and/or receiving telephone calls, the locations of the user when visiting various websites and/or using various applications, the phone number of the user, a time period that the phone number has been assigned to the user, whether the user subscribes to or has activated a spam telephone blocking service, how long the user has been a customer of the wireless carrier, whether the user is a prepaid customer or a postpaid customer, the type of computing device used to received telephone calls, whether the user is a customer through a mobile virtual network operator, the service plan of the user, a time period that the phone number was unused before assigning to the user, and/or any other similar characteristic.

The telephone call data analyzer 260 may include a characteristic comparer 275. The characteristic comparer 275 may be similar to the characteristic comparer 136 of FIG. 1. The characteristic comparer 275 may compare the characteristics of the phone numbers of the users. The characteristic comparer 275 may compare the characteristics of phones numbers in different classifications. For example, the characteristic comparer 275 may compare the characteristics of the phone numbers in the quartile with the fewest spam telephone calls to the characteristics of the phone numbers in the other three quartiles. The characteristic comparer 275 may identify differences in the characteristics between the characteristics of the phone numbers. For example, the characteristic comparer 275 may compare the phone numbers called from a phone number that receives more spam telephone calls than another phone number to the phone numbers called from the other phone number.

In some implementations, the characteristic comparer 275 may be configured to identify the characteristics that are different between those phone numbers that receive fewer spam telephone calls than other phone numbers. For example, the characteristic comparer 275 may compare the locations of the computing devices that receive fewer spam telephone calls to the locations of other computing devices. The locations may be the locations where the computing devices are located when receiving spam and non-spam telephone calls, when placing telephone calls, and/or when using an application on the computing device. The characteristic comparer 275 may determine that the computing devices that receive fewer spam telephone calls are not in a specific location when placing telephone calls when compared to the computing devices that receive more spam telephone calls. As another example, the characteristic comparer 275 may compare the phone numbers of the computing devices that receive fewer spam telephone calls to the phone numbers of the computing devices that receive more spam telephone calls. The characteristic comparer 275 may determine that the computing devices that receive fewer spam telephone calls do not have the form xxx-555-xxxx while the computing devices that receive more spam telephone calls have the form xxx-555-xxxx.

The telephone call data analyzer 260 may include an action selector 280. The action selector 280 may be similar to the action selector 142 of FIG. 1. The action selector 280 may be configured to select an action from the actions 245 in order to make the characteristics of a computing device or user of a phone number that receives more spam telephone calls more similar to the characteristics of a computing device or user of a phone number that receives fewer spam telephone calls. For example, the action selector 260 may select an action so that the characteristics of a user whose phone number receives more spam telephone calls than another phone number are more similar to the characteristics of the user of the other phone number.

The action selector 280 may use action selection rules 240 and/or action selection models 235 to select an action from the actions 245. An action selection rule may indicate to select the action of preventing calls to phone numbers that may be called from phone numbers that receive more spam telephone calls than other phone numbers. Another action selection rule may indicate to select the action of preventing access to applications and/or websites that may be accessed from computing devices that are associated with phone numbers that receive more spam telephone calls than other phone numbers. Some additional actions included in the actions 245 may include reassigning or modifying a phone number on a temporary or permanent basis, preventing outgoing calls while a computing device is in a particular location, preventing incoming calls while a computing device is in a particular location, removing a phone number from a website or directory, enrolling a user in a spam telephone call blocking service, and/or any other similar action.

The one or more processors 210 may implement a model trainer 285. The model trainer 285 may be configured to generate the action selection rules 240 by analyzing the historical data 250. The historical data 250 may include telephone call data, user data, numbers of spam telephone calls, and actions performed for various phone numbers. For example, the historical data 250 may include the telephone call data, user data, and number of spam telephone calls for the phone number 555-5656 before and after performance of an action such as preventing outgoing telephone calls to the phone number 555-8989. The historical data 250 may include telephone call data, user data, and number of spam telephone calls for the phone number 555-4747 before and after performance of an action such as deactivating the phone number 555-4747 for a period of time, e.g., one or two days. The historical data 250 may also include telephone call data, user data, and number of spam telephone calls for various phone numbers without data identifying an action.

The model trainer 285 may be configured to generate the action selection rules 240 by identifying patterns in the historical data 250. For example, the model trainer 285 may determine that the number of spam telephone calls that a phone number receives decreases if a computing device that corresponds to that phone number does not call certain phone numbers such as 555-8585 and 555-9595. The model trainer 285 may generate a rule that indicates that if a phone number is in the top quartile for receiving spam telephone calls and places telephone calls to 555-8585 and 555-9595, then the computing device of that phone number should be prevented from calling 555-8585 and 555-9595. The model trainer 285 may determine that the number of spam telephone calls that a phone number receives decreases relative to the number of days that a phone number was inactive before being assigned to the current customer. The model trainer 285 may generate a rule to increase the recommended number of days that a phone number is inactive as the number of spam telephone calls received by that phone number increases and/or the spam telephone call percentile is above a threshold percentile.

In some implementations, the model trainer 285 may be configured to generate the action selection rules 240 by analyzing telephone call data, user data, numbers of spam telephone calls, and actions performed for various phone numbers. The model trainer 285 may identify the phone numbers that receive the most spam telephone calls and the phone numbers that receive the least spam telephone calls. For example, the phone numbers that receive the most spam telephone calls may be in the top tenth percentile and the phone numbers that receive the least spam telephone calls may be in the bottom tenth percentile. The action selection rules 240 may generate rules to change characteristics of the phone numbers that receive the most spam telephone calls to match the phone numbers that receive the least spam telephone calls. The action selection rules 240 may determine that phone numbers that receive the most spam telephone calls place calls while in a certain area of the city and the phone numbers that receive the lease spam telephone calls do not place calls while in that certain area of the city. The model trainer 285 may generate a rule to prevent placing telephone calls while in that area of the city.

The model trainer 285 may be configured to train the action selection rules 240 using the historical data 250 and machine learning. The model trainer 285 may generate training data that includes data samples using the historical data 250. Based on the data samples, the trained model may be configured to receive different types and forms of data. The models may be configured to output an action to perform to reduce the number of received spam telephone calls for a given phone number.

The model trainer 285 may generate various types of data samples using the historical data 250. For example, a first type of data sample may include telephone call data for a phone number. The telephone call data may include the date, time, and duration of previous telephone calls. The telephone call data may also include data identifying the calling party and the called party. The data sample may also include the number of spam telephone calls received. The model trainer 285 may use these data samples to train an action selection model that is configured to receive telephone call data and a number of spam telephone calls received for a given phone number. The action selection model may be configured to output phone numbers that the computing device of the given phone number should avoid calling.

As another example, a second type of data sample may include user data for a computing device of a phone number. The user data may identify incoming and outgoing data of the data communication channel of the computing device. The user data may also include data indicating a geographic and network location of the other computing devices with which the computing device was communicating. The user data may include a geographic and network location of the computing device. The user data may include data identifying an application on the computing device that was in use when communicating with the computing devices. The data sample may also include the number of spam telephone calls received by the computing device. The model trainer 285 may use the data samples from multiple phone numbers to train an action selection model that is configured to receive user data and a number of spam telephone calls received for a given phone number. The action selection model may be configured to output applications and/or computing devices that the computing device should avoid communicating with and/or using.

As another example, a third type of data sample may include user data and/or telephone call data for one or more first phone numbers and a comparison between the user data and/or telephone call data for one or more second phone numbers. The one or more first phone numbers may be phone numbers that receive more spam telephone calls than the one or more second phone numbers. The one or more first phone numbers may be in a top percentile of received spam telephone calls, and the one or more second phone numbers may be in a bottom percentile of received spam telephone calls. The data sample may include the number of spam telephone calls received by each of the one or more first phone numbers and the one or more second phone numbers. The data sample may identify the differences between the one or more first phone numbers and the one or more second phone numbers. These differences may include phone numbers called by the one or more first phone numbers and not by the one or more second phone numbers. These differences may include applications used by computing devices of the one or more first phone numbers and not by the computing devices of the one or more second phone numbers. These differences may include a period of time that the one or more first and second phone numbers were inactive before being assigned to the current customer. The data sample may include other differences discussed above. The model trainer may use multiple data samples to train an action selection model that is configured to receive data similar to the data sample. The action selection model actions that the user and/or computing device should perform to reduce spam telephone calls.

As another example, a fourth type of data sample may include user data and/or telephone call data for a phone number for two time periods. The initial time period is before performance of an action and the subsequent time period is after performance of the action. The data sample may include data identifying the action, a number of received spam telephone calls for the initial time period, and a number of received spam telephone calls for the subsequent time period. The model trainer 285 may user the data samples from multiple phone numbers to train an action selection model that is configured to receive user data and/or telephone call data for a phone number and output an action for reducing the number of spam telephone calls received by that phone number. In some instances, the model trainer 285 may train models that are configured to receive data identifying a number of spam telephone calls received by the phone number.

The one or more processors 210 may implement an action performer 295. The action performer 295 may be similar to the action performer 118 of FIG. 1. The action performer 295 may be configured to receive an action from the action selector 280. The action performer 295 may perform the action by providing instructions to the computing device associated with the phone number analyzed by the telephone call data analyzer 260. The computing device may receive the instructions, implement the instructions, and provide a confirmation to the action performer 295 indicating implementation of the instructions. In some implementations, the computing device may receive the instructions and output an indication of the instructions on the display of the computing device. The indication of the instructions may provide the user the option of complying with the instructions or rejecting the instructions. If the user selects the option of complying with the instructions, then the computing device may comply with the instructions and provide an indication to the server 200. If the user selects the option of rejecting the instructions, then the computing device may provide an indication to the server indicating the rejection.

Figure 3:
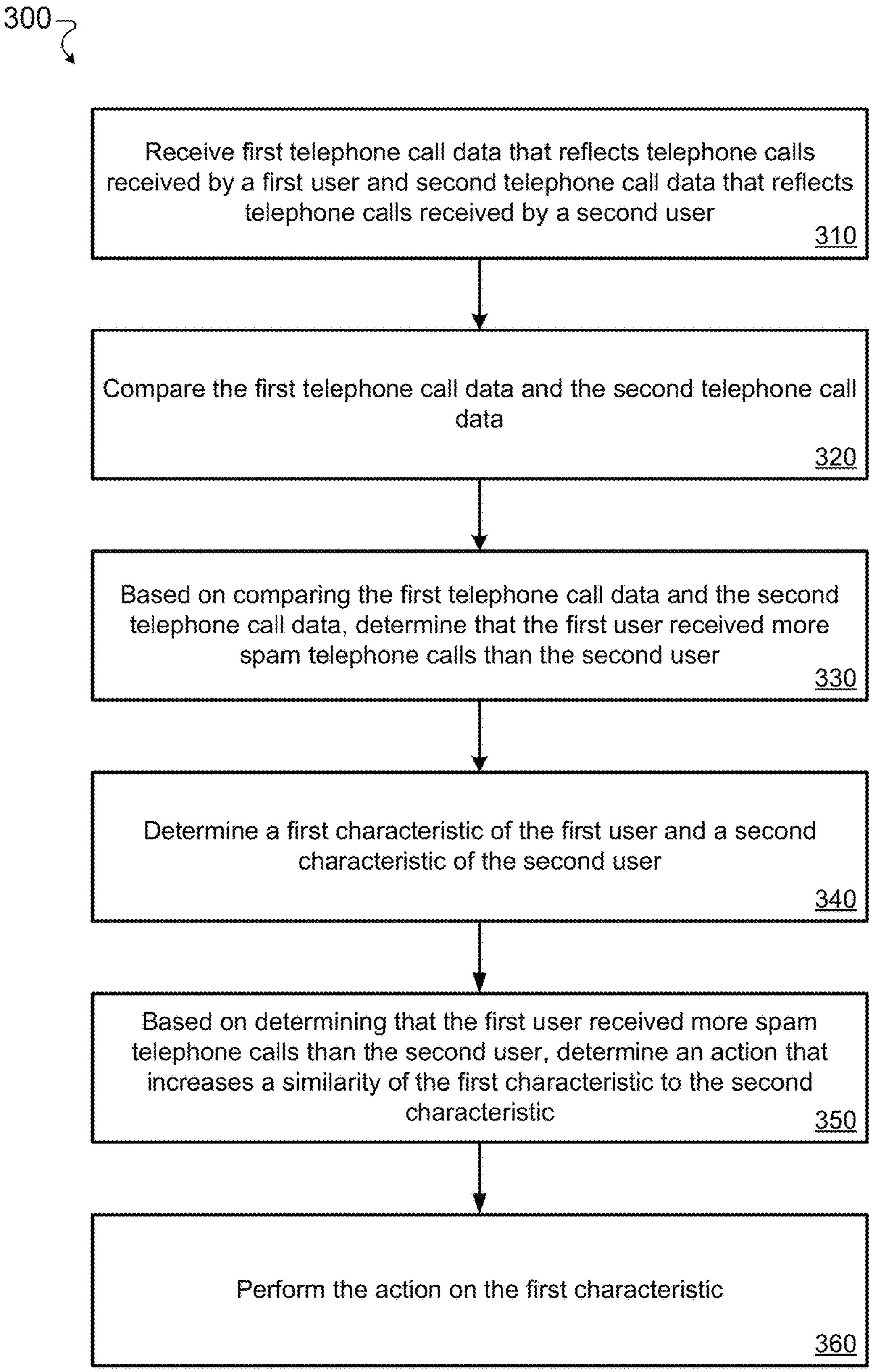
FIG. 3 is a flowchart of an example process for determining that a first user receives more spam telephone calls than a second user and performing actions to reduce the number of spam telephone calls received by the first user.

FIG. 3 is a flowchart of an example process 300 for determining that a first user 102 receives more spam telephone calls than a second user 104 and performing actions to reduce the number of spam telephone calls received by the first user 102. In general, the process 300 analyzes telephone call data to identify the spam telephone calls received by the first user 102 and the second user 104. The process 300 determines that the first user 102 receives more spam telephone calls than the second user 104. The process 300 determines characteristics of the first user 102 and the second user 104 and performs an action so that the characteristics of the first user 102 are more similar to the second user 104. The process 300 will be described as being performed by the server 134 of FIG. 1 and will include references to other components in FIG. 1. In some implementations, the process 300 may be performed by the server 200 of FIG. 2.

The server 134 receives first telephone call data 116 that reflects telephone calls received by a first user 102 and second telephone call data that reflects telephone calls received by a second user 104 (310). The telephone call data 116 may include data indicating the date, time, and/or the duration of telephone calls placed and received by the first user 102 and the second user 104. The telephone call data 116 may also include data indicating whether the called party answered the telephone call, whether the voicemail system answered the telephone call, and/or whether the calling party left a voicemail. The telephone call data may also include data identifying the calling party and data identifying the called party. The data identifying the calling party may include a phone number of the calling party, a name of the calling party, a geographic location of the calling party at the time of the call, a network location of the calling party at the time of the call, data identifying a computing device used by the calling party, and/or any other similar information of the calling party. The data identifying the called party may include a phone number of the called party, a name of the called party, a geographic location of the called party at the time of the call, a network location of the called party at the time of the call, data identifying a computing device used by the called party and/or any other similar information of the called party.

In some implementations, the server 134 may receive user data 120 of the first user 102 and the second user 104. The user data 120 may include data related to the incoming and outgoing data of the computing devices 106 and 108. The user data 120 may be related to the incoming and outgoing data of the data communication channel. The user data 120 may include a date, time, duration of the data exchanged, and/or the amount of data exchanged. The user data 120 may also include data indicating a geographic and network location of the computing device with which the computing devices 106 or 108 was communicating. The user data 120 may include data identifying an application on the computing devices 106 or 108 that interacted with the data exchanged.

The server 134 compares the first telephone call data and the second telephone call data (320). The server 134 may determine a first number of spam telephone calls received by the first user 102 during a period of time, and a second number of spam telephone calls received by the second user 104 during the period of time. The server 134 may compare the first number of spam telephone calls and the second number of spam telephone calls. In some implementations, the server 134 may compare the first telephone call data to predetermined call data that is associated with phone numbers that do not receive spam telephone calls.

Based on comparing the first telephone call data and the second telephone call data, the server 134 determines that the first user 102 received more spam telephone calls than the second user 104 (330). The server 134 may determine that the first user 102 received more spam telephone calls during the period of time. In some implementations, the server 134 may determine that the first user 102 received spam telephone calls at a higher rate than the second user 102.

The server 134 determines a first characteristic of the first user 102 and a second characteristic of the second user 104 (340). The characteristic of the first user 102 or the second user 104 may include the telephone numbers called by the user, the websites visited by the user, applications used by the user, the locations of the user when placing and/or receiving telephone calls, the locations of the user when visiting various websites and/or using various applications, the phone number of the user, a time period that the phone number has been assigned to the user, whether the user subscribes to or has activated a spam telephone blocking service, how long the user has been a customer of the wireless carrier, whether the user is a prepaid customer or a postpaid customer, the type of computing device used to received telephone calls, whether the user is a customer through a mobile virtual network operator, the service plan of the user, a time period that the phone number was unused before assigning to the user, and/or any other similar characteristic.

Based on determining that the first user 102 received more spam telephone calls than the second user 104, the server 134 determines an action 144 that increases a similarity of the first characteristic to the second characteristic (350). The action 144 may be preventing calls to phone numbers that may be called from phone numbers that receive more spam telephone calls than other phone numbers. Another action 144 may be preventing access to applications and/or websites that may be accessed from computing devices that are associated with phone numbers that receive more spam telephone calls than other phone numbers. Another action 144 may be reassigning or modifying a phone number on a temporary or permanent basis, preventing outgoing calls while a computing device is in a particular location, preventing incoming calls while a computing device is in a particular location, removing a phone number from a website or directory, enrolling a user in a spam telephone call blocking service, and/or any other similar action.

In some implementations, the first characteristic of the first user 102 is a first phone number of the first user 102, and the second characteristic of the second user 104 is a second phone number of the second user 104. The action 144 may be changing the first phone number to a third phone number that includes a greater number of digits matching the second phone number than a number of digits of the first phone number that match the second phone number. In this case, the server 134 may assign the first phone number to an internet of things device because an internet things of device, such as a refrigerator, may not be configured to ring when it receives a telephone call.

In some implementations, the first characteristic of the first user 102 is data identifying first websites visited by the first user 102, and the second characteristic of the second user 104 is data identifying second websites visited by the second user 104. The action 144 may be blocking the first user 102 from visiting one or more websites included in the first websites and not included in the second websites.

In some implementations, the first characteristic of the first user 102 is data identifying first phone numbers called by the first user 102, and the second characteristic of the second user 104 is data identifying second phone numbers called by the second user 104. The action 144 may be blocking the first user 102 from calling one or more phone numbers included in the first phone numbers and not included in the second phone numbers.

In some implementations, the first characteristic of the first user 102 is data identifying first locations of the first user 102 when placing or receiving telephone calls, and the second characteristic of the second user 104 is data identifying second locations of the second user 104 when placing or receiving telephone calls. The action 144 may be blocking the first user 102 from placing or receiving telephone calls while at one or more locations included in the first locations and not included in the second locations.

In some implementations, the first characteristic of the first user 102 is data identifying first websites or phone number lists that include the first phone number of the first user 102, and the second characteristic of the second user 104 is data identifying second websites or phone number lists that include the second phone number of the second user 104. The action 144 may be removing the first phone number from one or more websites or phone number lists that include the first phone number and do not include the second phone number. The server 134 may identify first websites or phone number lists that include the first phone number of the first user 102 by performing internet searches for the first phone number.

The server 134 performs the action 144 on the first characteristic (360). The server 134 may perform the action 144 by providing instructions 146 to the computing device 106 associated with the phone number of the user 102. The computing device 106 may receive the instructions 146, implement the instructions 146, and provide a confirmation to the server 134 indicating implementation of the instructions 146. In some implementations, computing device 106 may receive the instructions 146 and output an indication of the instructions 146 on the display of the computing device 106. The indication of the instructions 146 may provide the user 102 the option of complying with the instructions 146 or rejecting the instructions 146. If the user 102 selects the option of complying with the instructions 146, then the computing device 106 may comply with the instructions 146 and provide an indication to the server 134. If the user 102 selects the option of rejecting the instructions 146, then the computing device 106 may provide an indication to the server 134 indicating the rejection.

In some implementations, the server 134 may determine that the phone number of the second user 104 is available to assign to a third user. This may occur if the second user 104 cancels the account of the second user 104 with the wireless carrier. In this case, the server 134 may select the third user from among multiple users based on a number of spam telephone calls received by each of the multiple users. For example, if the third user is a current customer of the wireless carrier, and the phone number of the third user receives a number of spam telephone calls that places the third user in the top percentile of number of spam calls receives, then the server 134 may assign the third user the phone number of the second user 104 that receives fewer spam telephone calls. In some instances, the server 134 selects the third user based on the third user paying a fee for the phone number of the second user 104. In this case, the third user may be paying a fee to receive a phone number that has a history of receiving fewer spam telephone calls than other phone numbers.

Figure 4:
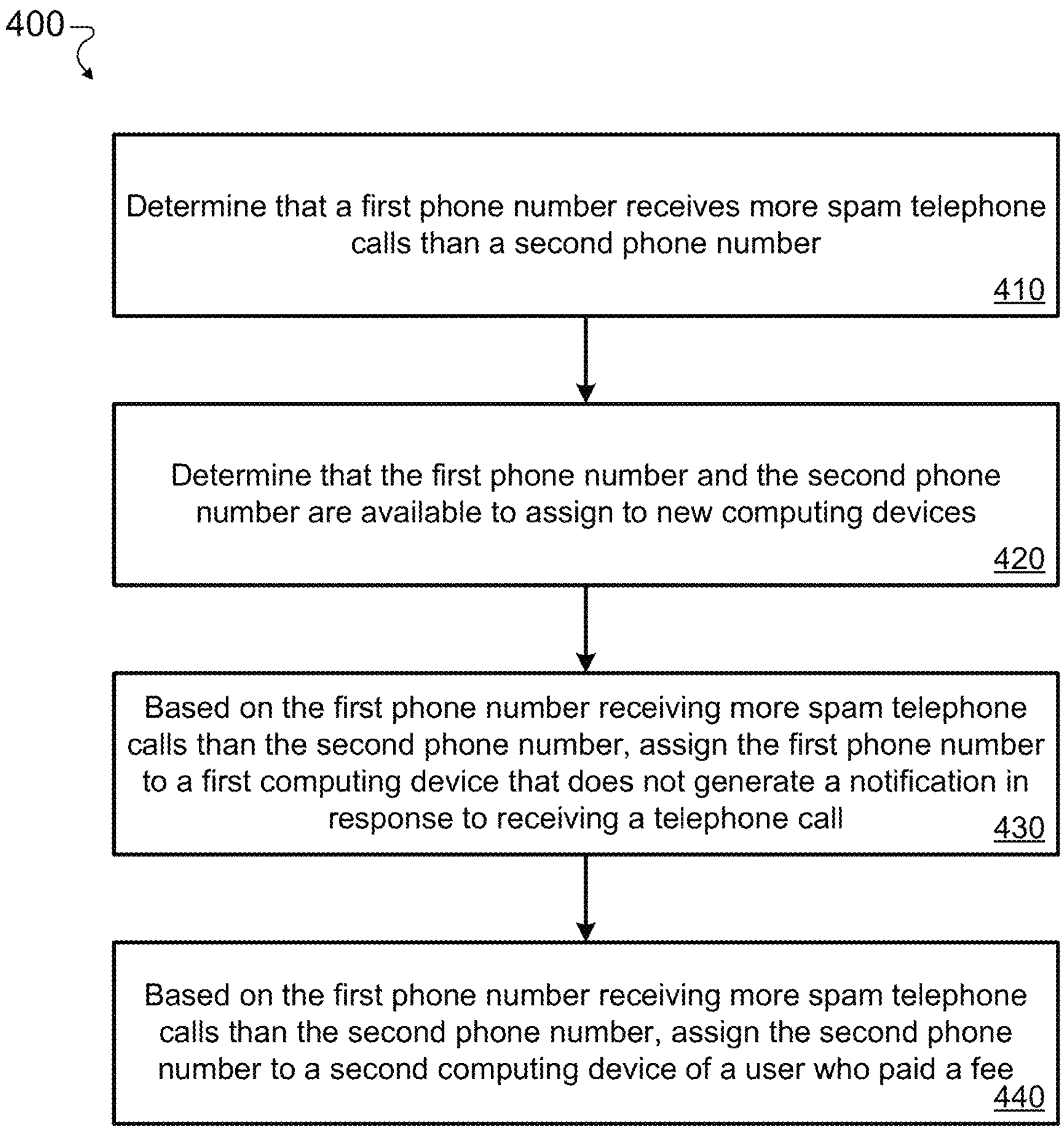
FIG. 4 is a flowchart of an example process for selecting computing devices to receive phone numbers based on the spam telephone calls received by the phone numbers.

FIG. 4 is a flowchart of an example process 400 for selecting computing devices to receive phone numbers based on the spam telephone calls received by the phone numbers. In general, the process 400 determines that a first phone number receives more spam telephone calls than a second phone number. When the first and second phone numbers are available for reassignment, the process 400 assigns the first phone number to a device that is not configured to conduct telephone calls and the second phone number to a device of a user who pays a fee to receive a phone number with a lower likelihood of receiving spam telephone calls. The process 400 will be described as being performed by the server 134 of FIG. 1 and will include references to other components in FIG. 1. In some implementations, the process 400 may be performed by the server 200 of FIG. 2.

The server 134 determines that a first phone number receives more spam telephone calls than a second phone number (410). In this case, the server 134 may determine that the first phone number receives more spam telephone calls overall or as a larger percentage of incoming telephone calls than the second phone number. The server 134 may analyze the telephone call data 116 to identify which telephone calls are spam telephone calls. For example, the server 134 may determine the first phone number received ten spam telephone calls in a period of time, and the second phone number received two spam telephone calls in the period of time. As another example, the server 134 may determine that ten percent of the spam telephone calls received by the first phone number were spam, and two percent of the spam telephone calls received by the second number were spam. This may occur if the first phone number received ten phone calls and one was spam, and the second telephone number received one hundred phone calls and two were spam.

The server 134 determines that the first phone number and the second phone number are available to assign to new computing devices (420). This may occur if the customers assigned to the first and second phone numbers cancelled their service with the wireless carrier, or if the server 134 resigned new phone numbers to the customers with the first and second phone numbers.

Based on the first phone number receiving more spam telephone calls than the second phone number, the server 134 assigns the first phone number to a first computing device that does not generate a notification in response to receiving a telephone call (430). The first computing device may be an internet of things device, such as an appliance or other smart home device. The first computing device may not output a notification when receiving a telephone call. Therefore, the server 134 may assign the first phone number, that receives more spam telephone calls than the second phone number, to the first computing device.

Based on the first phone number receiving more spam telephone calls than the second phone number, the server 134 assigns the second phone number to a second computing device of a user who paid a fee (440). The second computing device may belong to a user who is interested in paying a premium to ensure that the user does not receive spam telephone calls. This user may be willing to pay a fee to the wireless carrier to receive a phone number that has a history of receiving fewer spam telephone calls than other available phone numbers.

Figure 5:
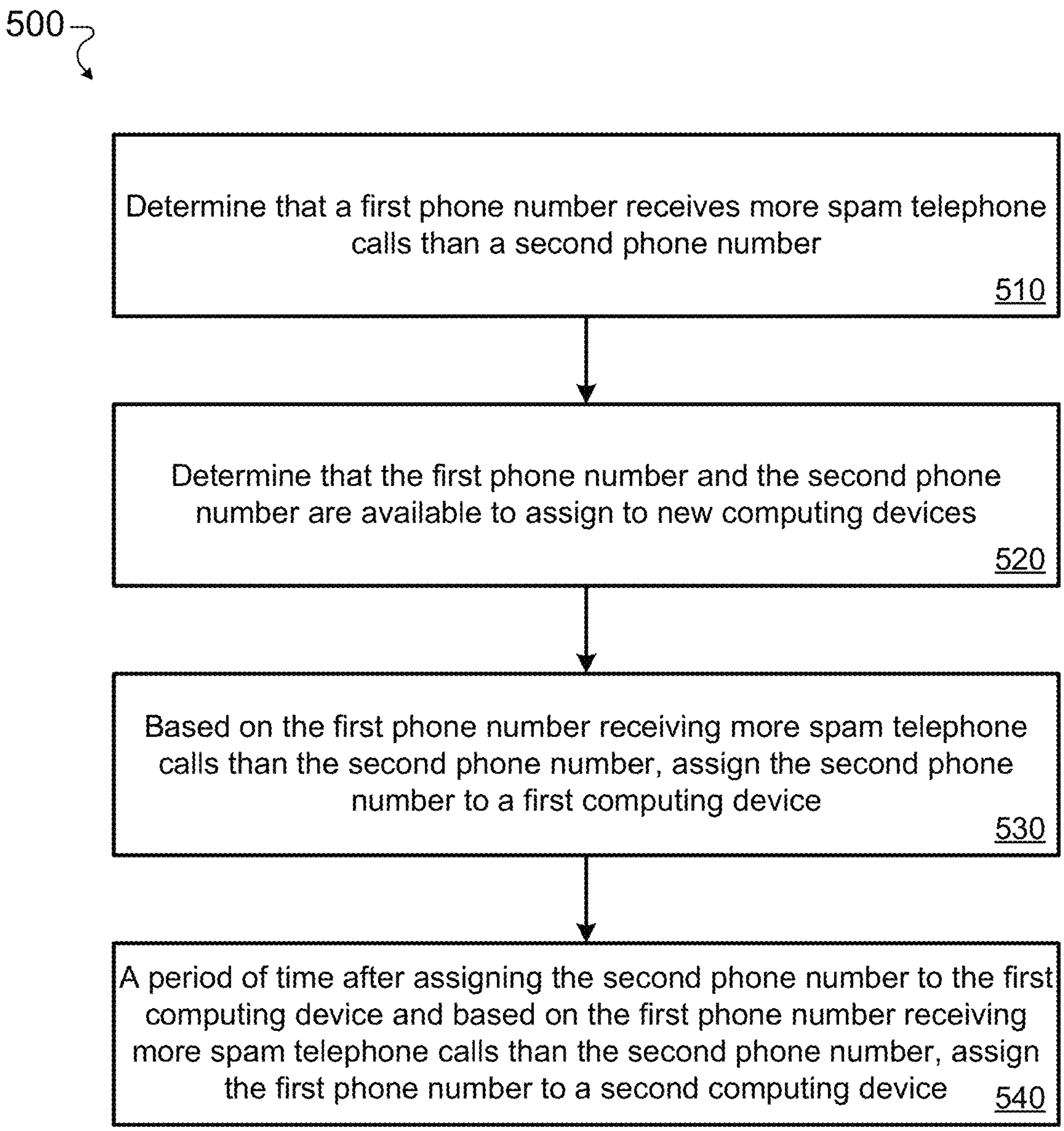
FIG. 5 is a flowchart of an example process for timing the reassignment of phone numbers based on spam telephone calls received by the phone numbers.

FIG. 5 is a flowchart of an example process 500 for timing the reassignment of phone numbers based on spam telephone calls received by the phone numbers. In general, the process 500 determines that a first phone number receives more spam telephone calls than a second phone number. When the first and second phone numbers are available for reassignment, the process 500 assigns the second phone number and then allows a period of time to elapse before assigning the first phone number to reduce the likelihood that the first phone number receives additional spam telephone calls. The process 500 will be described as being performed by the server 134 of FIG. 1 and will include references to other components in FIG. 1. In some implementations, the process 500 may be performed by the server 200 of FIG. 2.

The server 134 determines that a first phone number receives more spam telephone calls than a second phone number (510). In this case, the server 134 may determine that the first phone number receives more spam telephone calls overall or as a larger percentage of incoming telephone calls than the second phone number. The server 134 may analyze the telephone call data 116 to identify which telephone calls are spam telephone calls. For example, the server 134 may determine the first phone number received ten spam telephone calls in a period of time, and the second phone number received two spam telephone calls in the period of time. As another example, the server 134 may determine that ten percent of the spam telephone calls received by the first phone number were spam, and two percent of the spam telephone calls received by the second number were spam. This may occur if the first phone number received ten phone calls and one was spam, and the second telephone number received one hundred phone calls and two were spam.

The server 134 determines that the first phone number and the second phone number are available to assign to new computing devices (520). This may occur if the customers assigned to the first and second phone numbers cancelled their service with the wireless carrier, or if the server 134 resigned new phone numbers to the customers with the first and second phone numbers.

Based on the first phone number receiving more spam telephone calls than the second phone number, the server 134 assigns the second phone number to a first computing device (530). The server 134 may wait before reassigning the first and second phone numbers. The server 134 may reassign the second phone number without out waiting much time because the second phone number does not receive as many spam telephone calls as the first phone number. For example, the server 134 may assign the second phone number after the second phone number has been inactive for one week.

A period of time after assigning the second phone number to the first computing device and based on the first phone number receiving more spam telephone calls than the second phone number, the server 134 assigns the first phone number to a second computing device (540). In an attempt to reduce the number of spam telephone calls that the first phone number receives in the future, the server 134 may wait a longer period before reassigning the first phone number. During this time, spam telephone callers may attempt to call the first phone number. With the number disconnected, the spam telephone callers may remove the first phone number from the calling list. When the server 134 reassigns the first phone number to a new customer, spam telephone callers may have removed the first phone number from the calling lists. For example, the server 134 may assign the first phone number after the first phone number has been inactive for four weeks.

In some implementations, the server 134 may wait a period of time that is related to the number of spam calls received and/or the spam telephone call percentile in which the phone number is located. For example, if the phone number is in the quartile with the most spam telephone calls, then the server 134 may wait four weeks before reassigning. If the phone number is in the quartile with the fewest spam telephone calls, then the server 134 may wait one week before reassigning. As another example, if the phone number receives ten spam telephone calls per week, then the server 134 may wait five weeks before reassigning. If the phone number receives four spam telephone calls per week, then the server 134 may wait two weeks before reassigning.

Although a few implementations have been described in detail above, other modifications are possible. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method, comprising:
- determining that a first phone number receives more spam telephone calls than a second phone number;
- determining that the first phone number and the second phone number are available to assign to new computing devices; and
- based on the first phone number receiving more spam telephone calls than the second telephone number, assigning the first phone number to a first computing device that does not generate a notification in response to receiving a telephone call.

2. The method of claim 1, wherein determining that the first phone number receives more spam telephone calls than the second phone number comprises:
- determining that a first percentage of telephone calls received by the first phone number are spam;
- determining that a second percentage of telephone calls received by the second phone number are spam; and
- determining that the first percentage is greater than the second percentage.

3. The method of claim 1, wherein determining that the first phone number receives more spam telephone calls than the second phone number comprises:
- determining that the first phone number receives more spam telephone calls than the second phone number over a particular period of time.

4. The method of claim 1, wherein the first computing device is an internet of things device.

5. The method of claim 1, comprising:
- assigning the second phone number to a second computing device that is associated with a user who paid a fee to a wireless carrier for a phone number with a history of reduced spam telephone calls.

6. The method of claim 5, comprising:
- determining for a first period of time to pass from when the first phone number was available to assign to new computing devices before assigning the first phone number to the first computing device; and
- determining for a second period of time to pass from when the second phone number was available to assign to new computing devices before assigning the second phone number to the second computing device.

7. The method of claim 1, comprising:

determining first characteristics of the first computing device; and determining second characteristics of a second computing device, wherein assigning the first phone number to the first computing device is further based on the first characteristics or the second characteristics.

8. The method of claim 1, comprising:

determining a first period of time that the first phone number has been available to assign to new computing devices; and determining a second period of time that the second phone number has been available to assign to new computing devices, wherein assigning the first phone number to the first computing device is further based on the first period of time or the second period of time.

9. A system, comprising:

one or more processors; and memory including a plurality of computer-executable components that are executable by the one or more processors to perform a plurality of acts, the plurality of acts comprising:

determining that a first phone number receives more spam telephone calls than a second phone number;

determining that the first phone number and the second phone number are available to assign to new computing devices; and based on the first phone number receiving more spam telephone calls than the second telephone number, assigning the first phone number to a first computing device that does not generate a notification in response to receiving a telephone call.

10. The system of claim 9, wherein determining that the first phone number receives more spam telephone calls than the second phone number comprises:

determining that a first percentage of telephone calls received by the first phone number are spam;

determining that a second percentage of telephone calls received by the second phone number are spam; and determining that the first percentage is greater than the second percentage.

11. The system of claim 9, wherein determining that the first phone number receives more spam telephone calls than the second phone number comprises:

determining that the first phone number receives more spam telephone calls than the second phone number over a particular period of time.

12. The system of claim 9, wherein the first computing device is an internet of things device.

13. The system of claim 9, wherein the plurality of acts comprise:

assigning the second phone number to a second computing device that is associated with a user who paid a fee to a wireless carrier for a phone number with a history of reduced spam telephone calls.

14. The system of claim 13, wherein the plurality of acts comprise:

determining for a first period of time to pass from when the first phone number was available to assign to new computing devices before assigning the first phone number to the first computing device; and determining for a second period of time to pass from when the second phone number was available to assign to new computing devices before assigning the second phone number to the second computing device.

15. The system of claim 9, wherein the plurality of acts comprise:

determining first characteristics of the first computing device; and determining second characteristics of a second computing device, wherein assigning the first phone number to the first computing device is further based on the first characteristics and the second characteristics.

16. The system of claim 9, wherein the plurality of acts comprise:

determining a first period of time that the first phone number has been available to assign to new computing devices; and determining a second period of time that the second phone number has been available to assign to new computing devices, wherein assigning the first phone number to the first computing device is further based on the first period of time or the second period of time.

17. One or more non-transitory computer-readable media of a computing device storing computer-executable instructions that upon execution cause one or more computers to perform acts comprising:

determining that a first phone number receives more spam telephone calls than a second phone number;

determining that the first phone number and the second phone number are available to assign to new computing devices; and based on the first phone number receiving more spam telephone calls than the second telephone number, assigning the second phone number to a second computing device that generates a notification in response to receiving a telephone call.

18. The media of claim 17, wherein determining that the first phone number receives more spam telephone calls than the second phone number comprises:

determining that a first percentage of telephone calls received by the first phone number are spam;

determining that a second percentage of telephone calls received by the second phone number are spam; and determining that the first percentage is greater than the second percentage.

19. The media of claim 17, wherein determining that the first phone number receives more spam telephone calls than the second phone number comprises:

determining that the first phone number receives more spam telephone calls than the second phone number over a particular period of time.

20. The media of claim 17, wherein the acts comprise:

determining first characteristics of a first computing device; and determining second characteristics of the second computing device, wherein assigning the second phone number to the second computing device is further based on the first characteristics or the second characteristics.

* * * * *